United States Patent
Williams et al.

(10) Patent No.: US 7,204,313 B2
(45) Date of Patent: Apr. 17, 2007

(54) EQUALIZING FLAPPER FOR HIGH SLAM RATE APPLICATIONS

(75) Inventors: Ronald Williams, Broken Arrow, OK (US); Van McVicker, Broken Arrow, OK (US); Scott Strattan, Tulsa, OK (US); Jason B. Ives, Broken Arrow, OK (US)

(73) Assignee: Baker Hughes Incorporated, Houston, TX (US)

( * ) Notice: Subject to any disclaimer, the term of this patent is extended or adjusted under 35 U.S.C. 154(b) by 192 days.

(21) Appl. No.: 11/031,585

(22) Filed: Jan. 7, 2005

(65) Prior Publication Data
US 2006/0151177 A1 Jul. 13, 2006

(51) Int. Cl.
*E21B 34/14* (2006.01)
(52) U.S. Cl. .................. 166/324; 166/325; 166/332.7; 166/332.8
(58) Field of Classification Search ............. 166/332.8, 166/332.7, 324, 325; 137/630.14
See application file for complete search history.

(56) References Cited

U.S. PATENT DOCUMENTS

| | | | |
|---|---|---|---|
| 1,850,094 A * | 3/1932 | Dean | 137/242 |
| 4,415,036 A | 11/1983 | Carmody et al. | 166/324 |
| 4,475,599 A | 10/1984 | Akkerman | 166/323 |
| 4,478,286 A | 10/1984 | Fineberg | 166/324 |
| 6,079,497 A | 6/2000 | Johnston et al. | 166/324 |
| 6,296,061 B1 | 10/2001 | Leismer | 166/386 |
| 6,644,408 B2 | 11/2003 | Ives | 166/332.7 |
| 6,666,271 B2 * | 12/2003 | Deaton et al. | 166/332.8 |

FOREIGN PATENT DOCUMENTS

WO   WO 9857029 A1 * 12/1998

\* cited by examiner

*Primary Examiner*—David Bagnell
*Assistant Examiner*—Giovanna M Collins
(74) *Attorney, Agent, or Firm*—Shawn Hunter

(57) ABSTRACT

A flapper valve assembly is described having an equalizing port assembly with a bleed valve member that is moveable between an open position and a closed position. The equalizing port assembly features a structural support member in the form of a retainer key that is secured to the flapper valve member both axially and radially. Additionally, a compressible spring is located between the structural support member and provides biasing force upon the valve member to urge it toward a closed position. Additionally, the flapper valve member presents a pair of raised, substantially flat actuator contact portions upon its downstream face to meet an actuating tube in a mating contact arrangement and resist material deformation that could tend to clog or block the equalizing fluid flow port.

17 Claims, 3 Drawing Sheets

EQUALIZING FLAPPER FOR HIGH SLAM RATE APPLICATIONS

BACKGROUND OF THE INVENTION

1. Field of the Invention

The invention relates generally to equalizing flapper type valves that are used, for example, as subsurface safety valves.

2. Description of the Related Art

Wellbores often include subsurface safety valves used to close off a section of production tubing in the event of an emergency. Flapper valve assemblies have long been employed as safety valves. Flapper valve assemblies typically consist of a curved metal valve member that is shaped to seat upon an annular valve seat within the tubing flowbore to block fluid flow through the flowbore. The valve member is hingedly attached to the inside of the tubing and rotates about the hinge point between open and closed positions. A closed flapper valve is usually opened by an axially shiftable actuation sleeve that contacts the downstream face of the flapper valve and urges the valve member toward its open position. It is, however, difficult to open a flapper valve that has been closed by a high pressure differential. The fluid pressure holding the valve member in the closed position can be very difficult to overcome. It is, therefore, necessary to reduce (i.e., equalize) the pressure differential prior to opening the flapper. This may be done by incorporating an equalizing, or bleed, valve assembly into the flapper valve member.

Prior art equalizing flapper valves of this type are known. U.S. Pat. No. 4,478,286 issued to Fineberg and U.S. Pat. No. 6,644,408 issued to Ives are two examples of equalizing valves. Both of these patents are owned by the assignee of the present invention and both are incorporated herein by reference. Both patents describe flapper valve assemblies that have poppet-type equalizing valves retained therein to bleed off pressure from the upstream side of the flapper valve prior to opening the flapper valve assembly. While effective, these valve assemblies may not be well suited to high slam rate applications where the dynamic forces are so significant that they can damage the equalization valve element during closing (i.e., slamming) of the flapper. A particular problem that has been observed with prior art equalization valve assemblies is that the poppet valve components for the equalization valve assembly can be damaged as the flapper is slammed closed by fluid flow. As a result, the flapper may be unable to fully close off fluid flow as it is intended to do.

U.S. Pat. No. 6,296,061 issued to Leismer describes an equalization flapper device that uses a pilot activator located within a pilot bore and retained in place only by a hinge spring. U.S. Pat. No. 6,079,497 issued to Johnston et al. describes an equalization flapper assembly having a retention member that is formed from a cantilevered beam. Neither of these arrangements is sufficiently robust to effectively resist potential damage during high slam rate applications. Additionally, a cantilevered beam may be unsuitable for effectively biasing closed the equalizing valve because the beam member may not have adequate shape memory, in the manner that a compression spring would have. As a result, the equalizing port may not be fully closed in the absence of a significant pressure differential and may tend to leak fluid in any event.

A related problem with conventional equalizing flapper assemblies stems from damage caused to the upper (downstream) face of the flapper valve member from contact by the actuating sleeve. The axial faces of flapper valve members are curved and shaped as a natural consequence of forming the valve member to generally conform to the surrounding flow tube while in an open position. When a smaller, curved area of metal contacts the lower end of the actuating sleeve, the forces necessary to open the flapper element often deform the metal of the flapper element. Because the equalization valve is normally aligned with the lower end of the actuating sleeve, deformed metal can flow onto the equalization valve member itself, causing the valve member to become non-functional.

The present invention addresses the problems of the prior art.

SUMMARY OF THE INVENTION

The invention provides an improved equalizing flapper valve design which may be used within subterranean wellbores or other flow situations. The flapper valve of the present invention is particularly well suited for use in flowbores having high rates of fluid flow and high pressure differentials.

An exemplary flapper valve assembly is described wherein an equalizing port assembly is incorporated into the flapper valve member. The equalizing port assembly includes a poppet-type bleed valve member that is moveable between an open position, wherein fluid can pass through the flapper valve body, and a closed position, wherein fluid flow across the flapper valve body is blocked. The exemplary equalizing port assembly also features a structural support member in the form of a retainer key that is secured to the flapper valve member both axially and radially. In a presently preferred embodiment, the retainer key is retained within a set of grooves formed into the upstream face of the flapper member to preclude the retainer key from moving axially with respect to the valve member. A retainer screw affixes the retainer key against radial movement with respect to the flapper valve body. Additionally, a compressible spring is located between the structural support member and provides biasing force upon the valve member to urge it toward a closed position.

In a described embodiment, the flapper valve member presents a pair of raised, substantially flat actuator contact portions upon its downstream face. The contact portions are the first portions of the flapper valve member to contact the actuator tube as it is moved to open the flapper valve assembly. Because they are substantially flat, they meet the lower end in a mating contact arrangement and resist material deformation that could tend to clog or block the equalizing fluid flow port.

In a further desirable aspect, the fluid flow port of the equalizing port assembly features a dual counterbore design that helps prevent metal that might be deformed by the lower end of the actuating sleeve from flowing onto the equalization valve member.

It is believed that the equalizing valve assembly of the present invention provides a more suitable and secure valve arrangement in high slam applications than conventional equalizing valve assemblies that have heretofore been used in flapper valves.

DETAILED DESCRIPTION OF THE PREFERRED EMBODIMENTS

Figure 1:
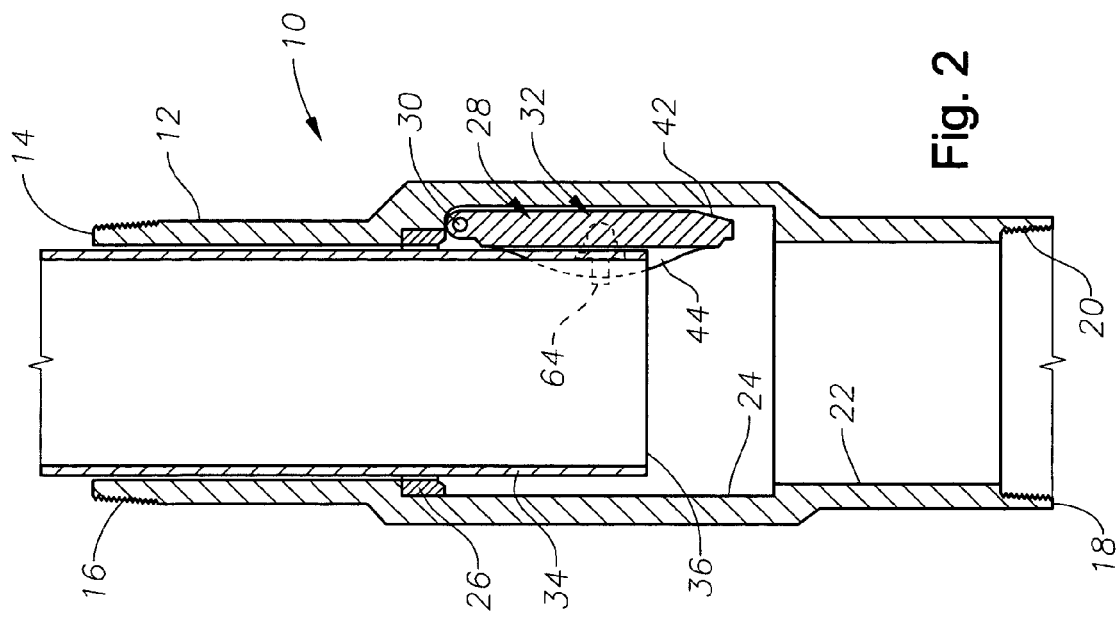
FIG. 1 is a side, cross-sectional view of an exemplary flapper valve assembly constructed in accordance with the present invention with the flapper valve element in a closed position.
Figure 2:
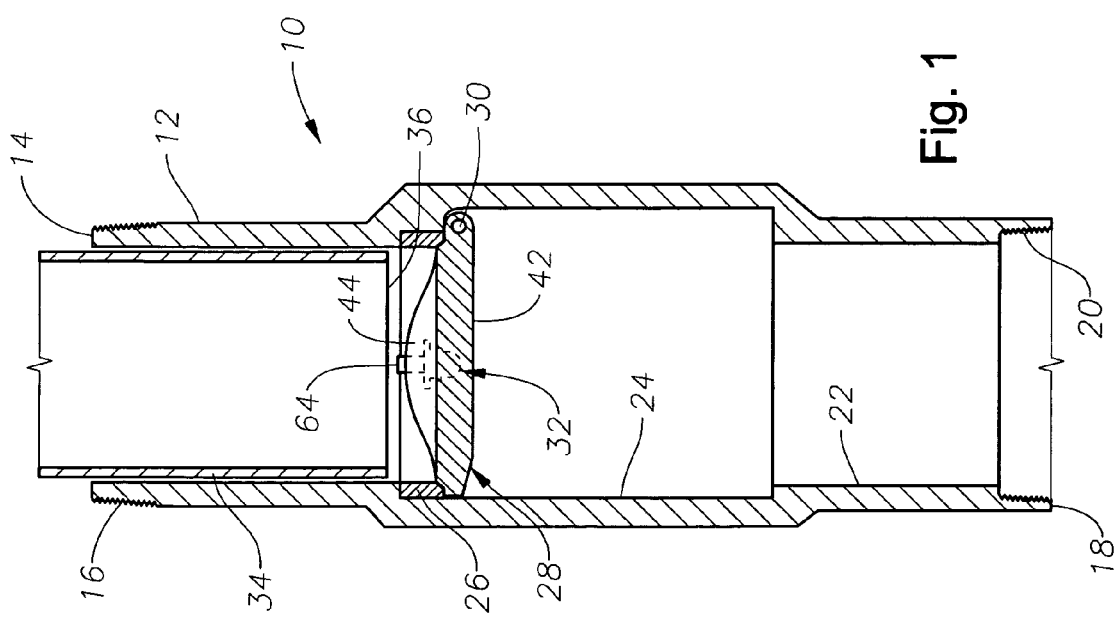
FIG. 2 is a side, cross-sectional view of an exemplary flapper valve assembly constructed in accordance with the present invention with the flapper valve element in an open position.

FIGS. 1 and 2 depict an exemplary equalizing flapper valve assembly 10 that is constructed in accordance with the present invention. The valve assembly 10 is typically incorporated into a production tubing string within a wellbore and used as a safety valve. The valve assembly 10 includes a valve housing 12 having a first axial end 14 with pin-type threading 16 for attachment to an adjacent section of production tubing (not shown) and a second axial end 18 with box-type threading 20 for attachment to an adjacent section of tubing (not shown). The valve housing 12 defines an axial flowbore 22 along its length having an enlarged central section 24. An annular valve seat 26 is secured within the enlarged central section 24. In this instance, it is desired to block fluid flowing from the second end 18 toward the first end 14. Therefore, the second end 18 will be considered to be upstream from the first end 14.

A flapper valve member 28 is hingedly secured to the valve seat 26 by hinge pin 30. The valve member 28 is rotationally moveable about the hinge pin 30 between an open position (shown in FIG. 2) and a closed position (FIG. 1), wherein the valve member 28 contacts and is seated upon the valve seat 26. A torsion spring (not shown) biases the valve member 28 toward its closed position. When in the closed position depicted in FIG. 1, the valve assembly 10 blocks fluid flowing downstream from the second end 18 toward the first end 14 of the housing. An equalizing port assembly, the structure and function of which will be described shortly, is generally indicated at 32.

An axially shiftable actuation member, which may be a conventional actuation tube or sleeve, 34 is disposed within the flowbore 22 above the valve seat 26. The actuation tube 34 may be axially shifted within the flowbore 22 by means of hydraulic fluid pressure, shifting tools, or using other methods known in the art. The actuation tube 34 is shiftable between an upper position (shown in FIG. 1) and a lower position (FIG. 2). The actuation tube 34 includes a lower engagement end 36 that may be substantially flat.

Figure 3:
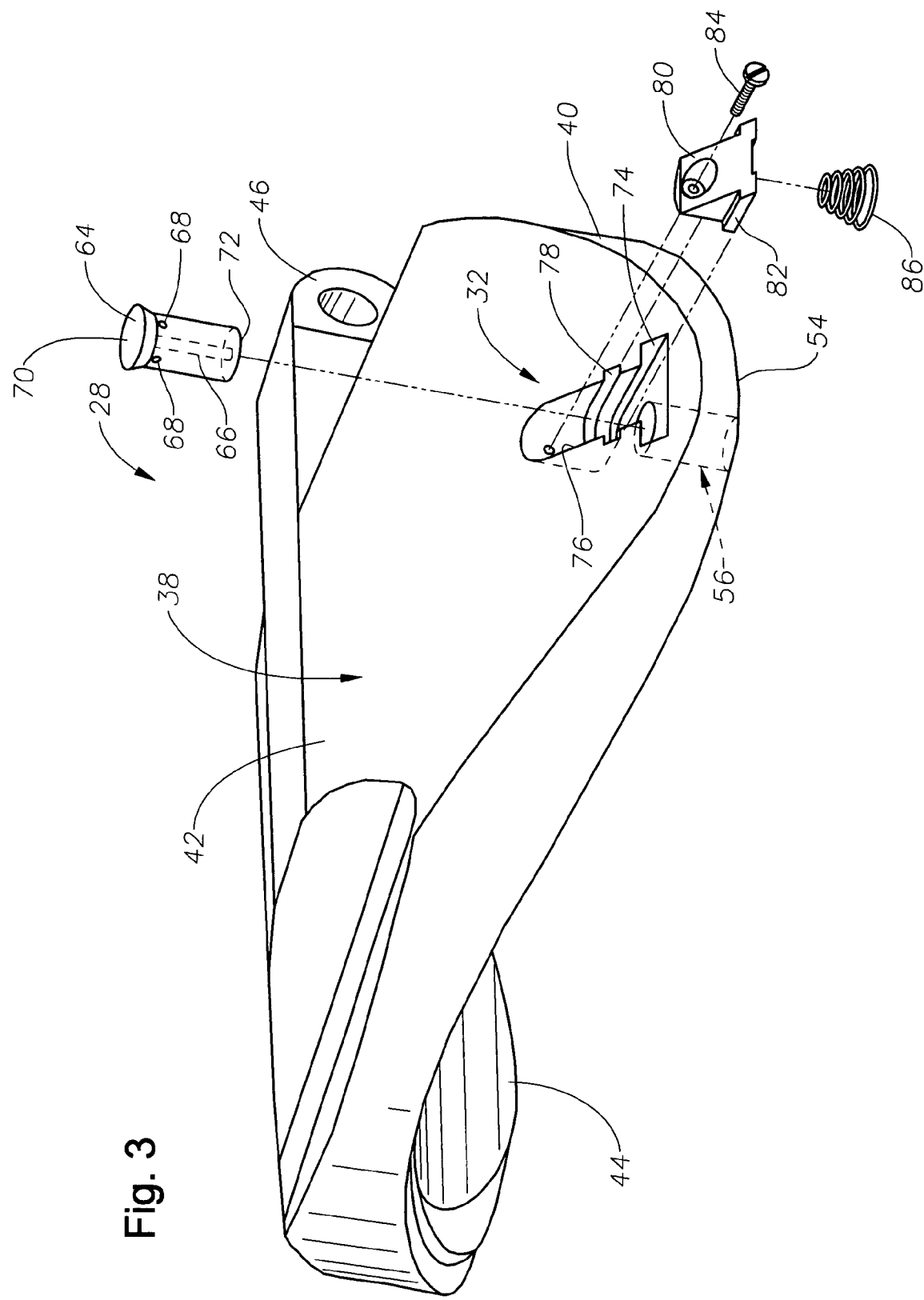
FIG. 3 is an isometric view of an exemplary equalizing flapper member.
Figure 4:
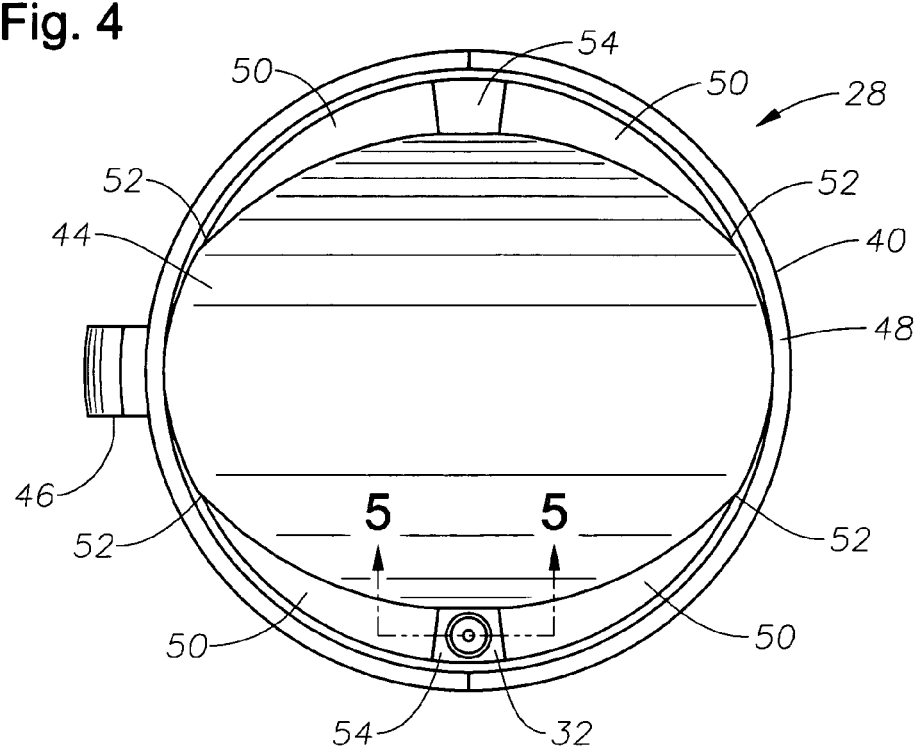
FIG. 4 is a plan view of the downstream face of the flapper member.
Figure 5:
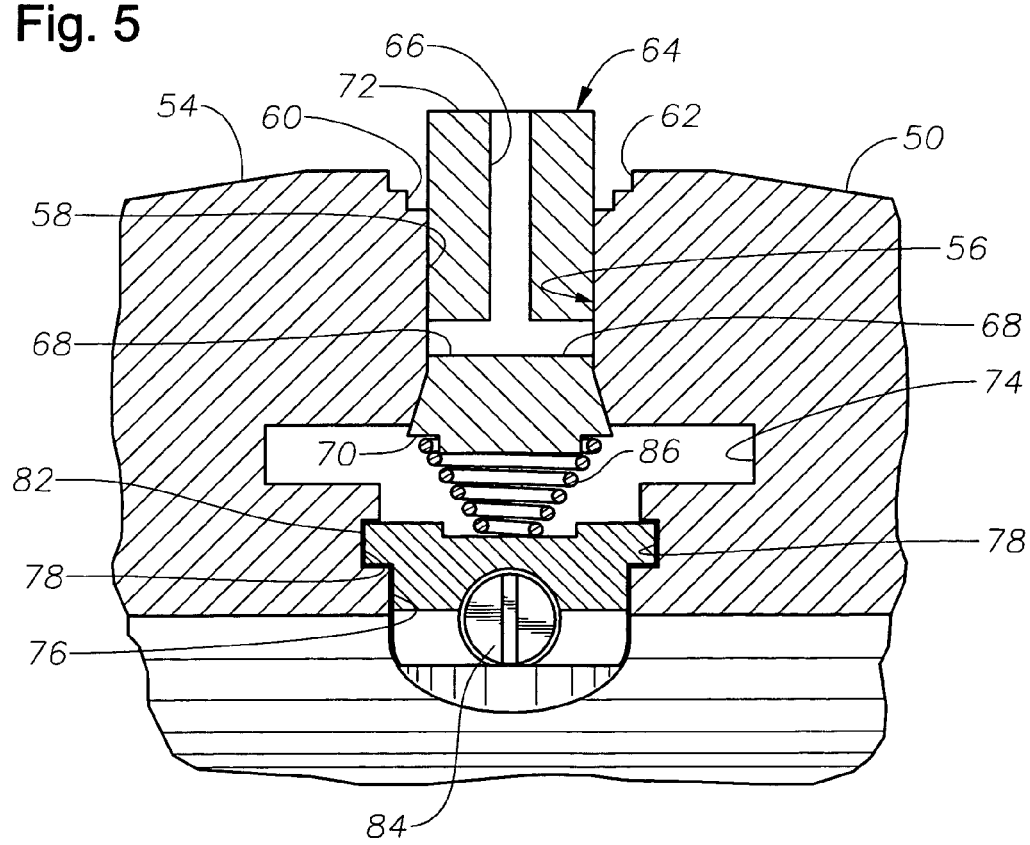
FIG. 5 is a cross-sectional view depicting the use of double counterbore flowport configuration.

The structure of the flapper valve member 28 and the equalizing port assembly 32 may be more fully understood with reference to FIGS. 3 through 5. The valve member 28 includes a main valve body 38 that is a generally saddle-shaped disc having a rounded radial perimeter 40. The main valve body 38 is arcuately curved so as to provide a curvature that approximates that of the interior surface of the flowbore 22. The valve body 38 presents upstream and downstream faces 42, 44, respectively. A hinge portion 46 extends radially outwardly from the main valve body 38. The upstream face 42 of the valve body 38 typically receives fluid pressure from the upstream direction.

The downstream face 44, shown in detail in FIG. 4, presents an outer rim portion 48 that is shaped and sized to contact and engage the valve seat 26 in a fluid sealing relation. Arcuate ramp areas 50 lie radially inwardly of the rim 48 and extend from end points 52 to substantially flat raised actuator contact portions 54 on either lateral side of the flapper member 28. The flat actuator contact portions 54 serve the function of initially contacting the actuation tube 34 when the tube 34 is moved downwardly to urge the flapper member 28 toward its open position. The contact portions 54 should be substantially flat so that they will abut the flat lower end of the actuation tube 34 in a mating fashion. Experience has shown that, if curved, the end of the actuation tube 34 will tend to deform the contact portions 54 and cause metal to flow onto and hinder operation of the equalizing port assembly 32.

The equalizing port assembly 32 is disposed through the flapper member 28 such that it is located within one of the actuator contact portions 54 (see FIG. 4). The equalizing port assembly 32 features a fluid flow port 56, best seen in FIG. 5, which passes through the flapper valve member 28. The flow port 56 features a dual counterbore design, which is pictured in FIG. 5. The flow port 56 has a central portion 58 and a first enlarged diameter portion 60 near the upstream axial end of the flow port 56. Additionally, there is a second enlarged diameter portion 62 at the upstream axial end of the flow port 56. The diameter of the second portion 62 is greater than the diameter of the first portion 60, and both portions 60, 62 are greater in diameter than the central portion 58. The presence of the enlarged diameter portions, or counterbores, 60, 62 at the axial upstream end is highly advantageous because it helps to prevent metal from the flapper valve member 28 that is deformed and displaced from flowing onto the bleed valve member 64 that is retained within the flow port 56 when the lower end of the actuation tube 34 contacts the flapper member 28. Rather than two counterbores, a single counterbore or a tapered counterbore might be used as well, so long as it provides the needed separation gap from the bleed valve member 64 to the surrounding flapper valve material. The preferred size of the gap may vary depending upon the particular materials used to fashion the body of the flapper valve member 28 and the size of the flow port 56 and bleed valve member 64. However, the gap should be sufficient to substantially prevent deformed and displaced metal from the flapper member 28 from flowing onto and contacting the bleed valve member 64 or interfering with its function.

The port assembly 32 also includes a bleed valve member 64 that is reciprocally retained within the flow port 56. Defined within the bleed valve member 64 is an axial flow passage 66 and lateral flow apertures 68. Also, the bleed valve member 64 presents an enlarged downstream end 70 and an upstream end 72.

On the upstream face 42 of the flapper valve member 28 (see FIG. 3) is a laterally disposed, substantially rectangular slot 74. Immediately upstream of the slot 74 is a shaped retainer recess 76 and a groove or guide track 78. A retainer key 80 is retained within the retainer recess 76. The retainer key 80 has a lateral flange 82 that is seated within the guide track 78. This seating of the flange 82 within the guide track 78 secures the retainer key 80 against axial movement with respect to the flapper member 28. A retainer screw 84 secures the retainer key 80 to the flapper member 28 so that the retainer key 80 cannot move radially with respect to the flapper member 28.

The bleed valve member 64 is movably disposed within the flow port 56 between an open position, wherein fluid can pass through the axial flow passage 66 and out through the lateral apertures 68, and a closed position (shown in FIG. 5) wherein the lateral apertures 68 are blocked against fluid flow. A compression spring member 86 resides within the slot 74 below the retainer recess 76 between the retainer key 80 and the bleed valve member 64. The compression spring member 86 contacts the enlarged end 70 of the bleed valve member 64 and biases the bleed valve member 64 toward a closed position, such that fluid is unable to pass through the apertures 68. In this closed position (illustrated in FIG. 5), the downstream end 72 of the bleed valve member 64 projects above the flat actuator contact portion 54.

In operation, the flapper valve assembly 10 is opened by moving the flapper member 28 from the closed position shown in FIG. 1 to the open position depicted in FIG. 2. To accomplish this, the actuation tube 34 is moved axially downwardly (i.e., in the upstream direction) until its lower end 36 contacts the downstream end 70 of the bleed valve member 64. The actuation tube 34 then urges the bleed valve member 64 toward its open position, compressing the spring 86. Fluid can now pass through the bleed valve member 64 so that the pressure differential across the flapper valve member 28 is reduced or equalized. Upon further downward movement of the actuation tube 34, the lower end 36 of the actuator tube 34 is brought into mating contact with both actuator contact portions 54 of the flapper member 28. Further downward movement of the actuation tube 34 then opens the flapper valve assembly 10.

To close the flapper assembly 10, the actuation tube 34 is moved upwardly within the valve housing 12. The torsion spring (not shown) urges the flapper member 28 toward its closed position. When the production tubing that incorporates the valve assembly 10 contains fluid that is at a high flow rate or under significant pressure, the flapper member 28 can slam shut against the valve seat 26 with considerable force. The construction of the equalizing port assembly 32 makes it highly unlikely that any components of the equalizing port assembly 32 will become dislodged from the flapper member 28. The retainer key 80 is secured both axially and radially with respect to the flapper member 28. The retainer key 80 provides a solid structural support that ensures that the bleed valve member 64 will remain disposed within the flow port 56, even during slamming of the flapper member 28 because the retainer key 80 physically blocks the bleed valve member 64 from removal on the upstream side 42 of the flapper valve member 28. Additionally, the enlargement at the end 70 of the bleed valve member 64 ensures that the bleed valve member 64 cannot pop free from the downstream side 44 of the flapper member 28.

Those of skill in the art will recognize that numerous modifications and changes may be made to the exemplary designs and embodiments described herein and that the invention is limited only by the claims that follow and any equivalents thereof.

What is claimed is:

1. A flapper valve assembly comprising:
a tubular valve housing defining a flowbore within;
a flapper valve member within the flowbore and pivotally connected to the valve housing for movement between open and closed positions;
an equalizing port assembly for selectively equalizing fluid pressure across the flapper valve member, the equalizing port assembly comprising:
a fluid flow port disposed through the flapper valve body;
a bleed valve member disposed within the flow port and moveable between open and closed positions;
a retainer key secured within the flapper valve member radially and axially to retain the bleed valve member within the flow port
a compressible spring disposed between the retainer key and the bleed valve member to bias the bleed valve member toward a closed position;
an actuation tube for selectively moving the flapper valve member from a closed to an open position; and
wherein the flapper valve member presents a downstream side having a raised, substantially flat actuator contact portion for contacting the actuation tube, and the equalizing port assembly is disposed through the flapper valve member within said contact portion.

2. The flapper valve assembly of claim 1 wherein the fluid flow port has an axial end portion of enlarged diameter to provide a separation gap surrounding the bleed valve member, thereby reducing the potential for deformed flapper valve material to contact the bleed valve member.

3. The flapper valve assembly of claim 1 wherein the bleed valve member comprises a central body section with a radially enlarged upstream end.

4. The flapper valve assembly of claim 1 wherein the bleed valve member defines within an axial flow passage and a lateral aperture to permit selective fluid passage through the bleed valve member.

5. The flapper valve assembly of claim 1 wherein the retainer key is secured against radial movement with respect to the flapper valve member by a screw-type connector.

6. The flapper valve assembly of claim 1 wherein the retainer key is secured against axial movement with respect to the flapper body by an interlocking flange and groove arrangement.

7. A flapper valve assembly comprising:
a tubular valve housing defining a flowbore within;
a flapper valve member within the flowbore and pivotally connected to the valve housing for movement between open and closed positions;
an equalizing port assembly for selectively equalizing fluid pressure across the flapper valve member, the equalizing port assembly comprising:
a fluid flow port disposed through the flapper valve body;
a bleed valve member disposed within the flow port and moveable between open and closed positions;
a retainer key secured within the flapper valve member radially and axially to retain the bleed valve member within the flow port
a compressible spring disposed between the retainer key and the bleed valve member to bias the bleed valve member toward a closed position;
an actuation tube for selectively moving the flapper valve member from a closed to an open position; and
wherein the flapper valve member presents a downstream side having a pair of raised, substantially flat actuator contact portions for contacting the actuation tube.

8. The flapper valve assembly of claim 7 wherein the fluid flow port has an axial end portion of enlarged diameter to provide a separation gap surrounding the bleed valve member, thereby reducing the potential for deformed flapper valve material to contact the bleed valve member.

9. The flapper valve assembly of claim 7 wherein the bleed valve member comprises a central body section with a radially enlarged upstream end.

10. The flapper valve assembly of claim 7 wherein the bleed valve member defines within an axial flow passage and a lateral aperture to permit selective fluid passage through the bleed valve member.

11. The flapper valve assembly of claim 7 wherein the retainer key is secured against radial movement with respect to the flapper valve member by a screw-type connector.

12. The flapper valve assembly of claim 7 wherein the retainer key is secured against axial movement with respect to the flapper body by an interlocking flange and groove arrangement.

13. A flapper valve assembly comprising:
   a flapper valve member that is pivotally movable between open and closed positions, the flapper valve member having an upstream face and a downstream face
   an equalizing port assembly within the flapper valve member for selectively equalizing fluid pressure across the flapper valve member, the equalizing port assembly comprising:
      a fluid flow port disposed through the flapper valve member;
      a bleed valve member disposed within the flow port and moveable between open and closed positions;
      a retainer key secured to the flapper valve member by a threaded connector, the retainer key forming a structural support toward which the bleed valve is biased during opening to prevent the bleed valve member from becoming released from the flow port;
   a compressible spring located between the bleed valve member and the retainer key to bias the bleed valve member toward the closed position;
   wherein the downstream face of the flapper valve member presents a raised, substantially flat actuator contact portion for contacting an end of an actuation tube; and
   an actuation tube that is selectively moveable into and out of contact with the downstream face of the flapper valve member to open the bleed valve member by contacting the actuator contact portion and the bleed valve member.

14. The flapper valve assembly of claim 13 wherein the fluid flow port has an axial end portion of enlarged diameter to provide a separation gap surrounding the bleed valve member, thereby reducing the potential for deformed flapper valve material to contact the bleed valve member.

15. The flapper valve assembly of claim 13 wherein the bleed valve member comprises a central body section with a radially enlarged upstream end.

16. The flapper valve assembly of claim 13 wherein the bleed valve member defines within an axial flow passage and a lateral aperture to permit selective fluid passage through the bleed valve member.

17. The flapper valve assembly of claim 13 wherein the retainer key is secured against axial movement with respect to the flapper body by an interlocking flange and groove arrangement.

* * * * *